United States Patent
Matsui

(10) Patent No.: US 9,197,786 B2
(45) Date of Patent: Nov. 24, 2015

(54) IMAGE READING DEVICE, IMAGE FORMING APPARATUS, AND IMAGE READING METHOD

(71) Applicant: KYOCERA DOCUMENT SOLUTIONS INC., Osaka (JP)

(72) Inventor: Shinya Matsui, Osaka (JP)

(73) Assignee: KYOCERA Document Solutions Inc., Osaka (JP)

( * ) Notice: Subject to any disclaimer, the term of this patent is extended or adjusted under 35 U.S.C. 154(b) by 0 days.

(21) Appl. No.: 14/288,519

(22) Filed: May 28, 2014

(65) Prior Publication Data

US 2014/0355074 A1    Dec. 4, 2014

(30) Foreign Application Priority Data

May 30, 2013   (JP) .................................. 2013-114429

(51) Int. Cl.
*H04N 1/40*   (2006.01)
*H04N 1/407*   (2006.01)
*H04N 1/401*   (2006.01)

(52) U.S. Cl.
CPC ............. *H04N 1/4076* (2013.01); *H04N 1/401* (2013.01)

(58) Field of Classification Search
None
See application file for complete search history.

(56) References Cited

U.S. PATENT DOCUMENTS

| 5,929,417 | A * | 7/1999 | Hayashi et al. ............... 235/454 |
| 7,110,917 | B2 * | 9/2006 | Matsuura et al. ............. 702/185 |
| 8,619,339 | B2 | 12/2013 | Fukutome et al. |
| 2008/0231917 | A1 * | 9/2008 | Tsukahara .................... 358/475 |
| 2011/0188092 | A1 | 8/2011 | Fukutome et al. |

FOREIGN PATENT DOCUMENTS

| JP | H06-022133 | A | 1/1994 |
| JP | H10-243228 | A | 9/1998 |
| JP | H11-261816 | A | 9/1999 |
| JP | 2004-266512 | A | 9/2004 |
| JP | 2011-160045 | A | 8/2011 |
| JP | 2013-085132 | A | 5/2013 |

OTHER PUBLICATIONS

An Office Action; "Notice of Reasons for Rejection," issued by the Japanese Patent Office on Jul. 7, 2015, which corresponds to Japanese Patent Application No. 2013-114429 and is related to U.S. Appl. No. 14/288,519.

* cited by examiner

*Primary Examiner* — Vincent Rudolph
*Assistant Examiner* — Michael Burleson
(74) *Attorney, Agent, or Firm* — Studebaker & Brackett PC

(57) ABSTRACT

An image reading device includes a density reference plate, an image reading section, a storage section, and a control section. When density reference data for at least one of a plurality of colors with respect to at least one of a plurality of regions is abnormal data, the control section calculates a change rate. The change rate is a rate of change between preliminary density reference data and density reference data both for one of the colors other than the at least one color with respect to the at least one region. The control section corrects the abnormal data based on the change rate calculated with respect to the at least one region and also on preliminary density reference data for the at least one color with respect to the at least one region.

12 Claims, 8 Drawing Sheets

IMAGE READING DEVICE, IMAGE FORMING APPARATUS, AND IMAGE READING METHOD

INCORPORATION BY REFERENCE

The present application claims priority under 34 U.S.C. §119 to Japanese Patent Application No. 2013-114429, filed May 30, 2013. The contents of this application are incorporated herein by reference in their entirety.

BACKGROUND

The present disclosure relates to image reading devices, image forming apparatuses, and image reading methods.

An image reading device reads an image of an original document with a photodetector that detects light emitted by a light source and then reflected by the original document. Such an image reading device is used as a scanner and also as a component of an image forming apparatus, such as a multi-function peripheral, a copier, and a facsimile machine.

Even when an image reading device reads the same original document, the amount of light detected by the photodetector may fluctuate for each reading operation. For example, the amount of light detected by the photodetector may fluctuate with changes in the ambient conditions or in the light source, the optical system, and/or the photodetector. To address the above, the image reading device typically performs shading correction by using a density reference plate to suppress the fluctuations in the amount of light.

Unfortunately, when the optical path from the light source to the photodetector is contaminated, appropriate shading correction is not possible. Some image reading devices may correct data with secondary white reference data in the case where the optical system is contaminated. Such an image reading device performs shading correction by using the white reference data obtained by reading the density reference plate in the case where the scanning optical system is not contaminated. However, in the case where the scanning optical system is contaminated with paper dust or the like, the shading correction is performed by using the secondary white reference data stored in advance in non-volatile memory.

SUMMARY

An image reading device according to the present disclosure includes a density reference plate, an image reading section, a storage section, and a control section. The image reading section obtains, with respect to each of a plurality of regions, density reference data for each of a plurality of colors by reading the density reference plate. The storage section stores, with respect to each of the plurality of regions, preliminary density reference data for each of the plurality of colors. The control section determines, with respect to each of the plurality of regions, whether or not the density reference data obtained for each of the plurality of colors by the image reading section is abnormal data. The control section calculates a change rate when the density reference data for at least one of the plurality of colors with respect to at least one of the plurality of regions is abnormal data, the change rate being a rate of change between the preliminary density reference data and the density reference data both for one of the colors other than the at least one color with respect to the at least one region. The control section corrects the abnormal data based on the change rate calculated with respect to the at least one region and also on the preliminary density reference data stored for the at least one color with respect to the at least one region.

An image forming apparatus according to the present disclosure includes the above image reading device and a print section.

An image reading method according to the present disclosure involves: obtaining, with respect to each of a plurality of regions, density reference data for each of a plurality of colors by reading a density reference plate; determining, with respect to each of the plurality of regions, whether or not the density reference data obtained for each of the plurality of colors is abnormal data; calculating a change rate when the density reference data for at least one of the plurality of colors with respect to at least one of the plurality of regions is abnormal data, the change rate being a rate of change between the preliminary density reference data and the density reference data both for one of the colors other than the at least one color with respect to the at least one region; and correcting the abnormal data based on the change rate calculated with respect to the at least one region and also on the preliminary density reference data for the at least one color with respect to the at least one region.

DETAILED DESCRIPTION

The following describes embodiments directed to an image reading device, an image forming apparatus, and an image reading method all according to the present disclosure, with reference to the accompanying drawings. However, the present disclosure is not limited to the specific embodiments described below.

Figure 1:
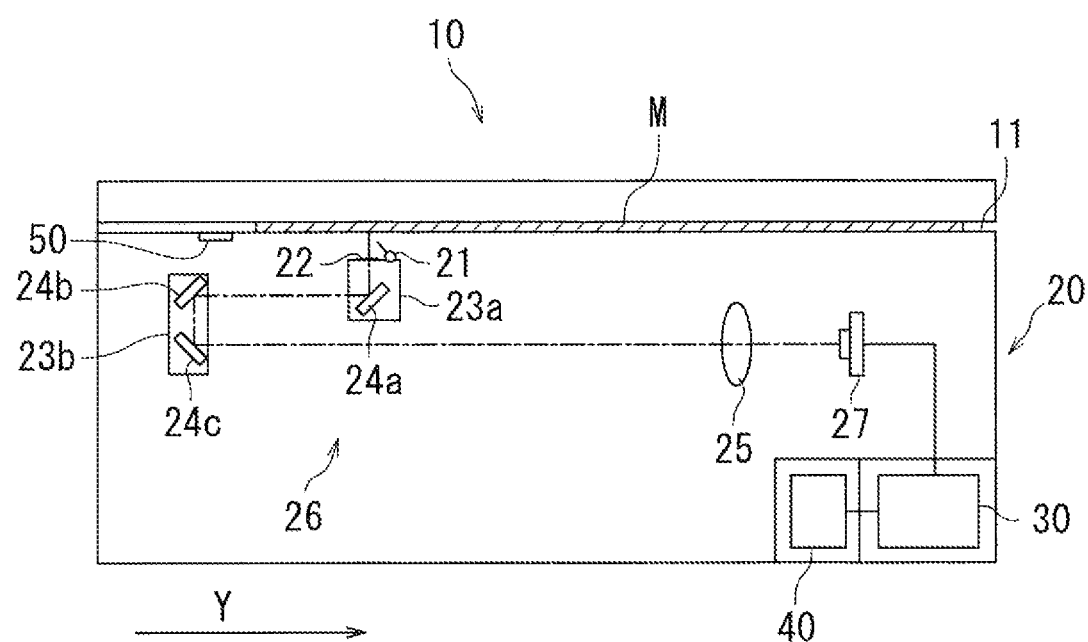
FIG. 1 is a schematic view of an image reading device according to an embodiment of the present disclosure.

With reference to FIG. 1, the following describes an image reading device 10 according to an embodiment of the present disclosure. FIG. 1 is a schematic view of the image reading device 10 according to the embodiment of the present disclosure.

The image reading device 10 includes an image reading section 20, a control section 30, a storage section 40, and a density reference plate 50. Typically, the image reading device 10 further includes a document table 11. The image reading device 10 reads an original document M placed on the document table 11 to obtain an input image. According to the present embodiment, the image reading device 10 is a scanner, and the original document M is paper. The original document M may, for example, be cloth or a three-dimensional object with a thickness.

The image reading section 20 includes a light source 21, an optical system 26, and an imaging section 27. The image reading section 20 is disposed under the document table 11. The optical system 26 includes a plurality of reflection mirrors (namely, reflection mirrors 24a, 24b, and 24c) and a lens 25. The light source 21 and the reflection mirror 24a are secured to a first carriage 23a. The first carriage 23a is provided with a slit 22. The reflection mirrors 24b and 24c are secured to a second carriage 23b.

Light emitted from the light source 21 reaches the imaging section 27 via the optical system 26. The following describes the process in which light emitted from the light source 21 reaches the imaging section 27. The light source 21 that is elongated in a main scanning direction illuminates the document table 11 from below. Here, the main scanning direction is a direction perpendicular to a paper surface of FIG. 1 (the direction not shown), and a sub-scanning direction is the Y direction. Light emitted from the light source 21 is reflected by the original document M, passes through the slit 22 to reach the reflection mirror 24a. Light having reached the reflection mirror 24a is reflected by the reflection mirror 24a and then guided by the reflection mirrors 24b and 24c to pass through the lens 25 and reaches the imaging section 27.

The light source 21 may be a white light source. In that case, when a color image of the original document M is read, the white light is separated into the individual colors (into the three colors of red, green, and blue according to the present embodiment) by a color filter (not shown) before reaching the imaging section 27. Thus, light of separated colors reach the imaging section 27. Alternatively, the light source 21 may be a set of light sources respectively emitting different colors of light (light sources of three colors, namely, a red light source, a green light source, and a blue light source according to the present embodiment). In that case, light of the respective colors reach the imaging section 27.

At the time when the image reading section 20 reads the original document M, the first carriage 23a moves in the sub-scanning direction Y together with the light source 21 that is emitting light. The second carriage 23b moves to keep the optical path length constant between the light source 21 and the imaging section 27.

The imaging section 27 is a charge coupled device (CCD) sensor, for example. The imaging section 27 generates an analog electric signal from the light having reached the imaging section 27. To read a color image of the original document M, the imaging section 27 receives light of a plurality of colors (for example, red, green, and blue) and generates a plurality of analog electric signals corresponding to the respective colors. Subsequently, an A/D conversion section (not shown) converts each analog signal into a digital signal. Each resulting digital signal is input to the control section 30.

In the present embodiment, the density reference plate 50 is a white reference plate. The density reference plate 50 is elongated in the main scanning direction. The image reading section 20 has a plurality of regions arrayed in the main scanning direction. The image reading section 20 obtains, with respect to each of the plurality of regions, density reference data for each of a plurality of colors (red, green, and blue according to the present embodiment). The image reading section 20 obtains the density reference data corresponding to the position of each pixel region arrayed in the main scanning direction, by reading the density reference plate 50. In the case where the density reference plate 50 is a white reference plate, the image reading section 20 reads the white reference plate to obtain white reference data.

The control section 30 performs shading correction based on the density reference data. The shading correction is applied to the results obtained by reading the original document M in order to prevent degradation in the read image due to non-uniform light emission by the light source 21 or non-uniform sensitivity of the imaging section 27. The shading correction is performed each time the original document M is read.

The storage section 40 stores preliminary density reference data. The preliminary density reference data corresponds to the density reference data obtained by the image reading section 20. That is, the storage section 40 stores, with respect to each of the plurality of regions, preliminary density reference data for each of the plurality of colors.

Before the factory shipment, the control section 30 stores into the storage section 40 the preliminary density reference data obtained by reading the density reference plate 50 by the image reading section 20. Also, each time the image reading section 20 reads the density reference plate 50 or at a regular interval, the control section 30 stores into the storage section 40 the density reference data that is newly obtained by newly reading the density reference plate 50 by the image reading section 20.

For example, when the density reference plate 50 has a defect, such as flaw, the density reference data obtained by reading the region where the defect is present may be abnormal data indicating an abnormal value. When the density reference data is abnormal data, the shading correction may not be correctly performed, which cause a risk that streaks appear in the image obtained by reading the original document M. Especially when the color balance of the density reference data is altered, the image is read in the color tone different from that of the original document M. When the density reference data is abnormal data, the control section 30 of the image reading device 10 appropriately corrects the abnormal data by using preliminary density reference data.

Figure 2:
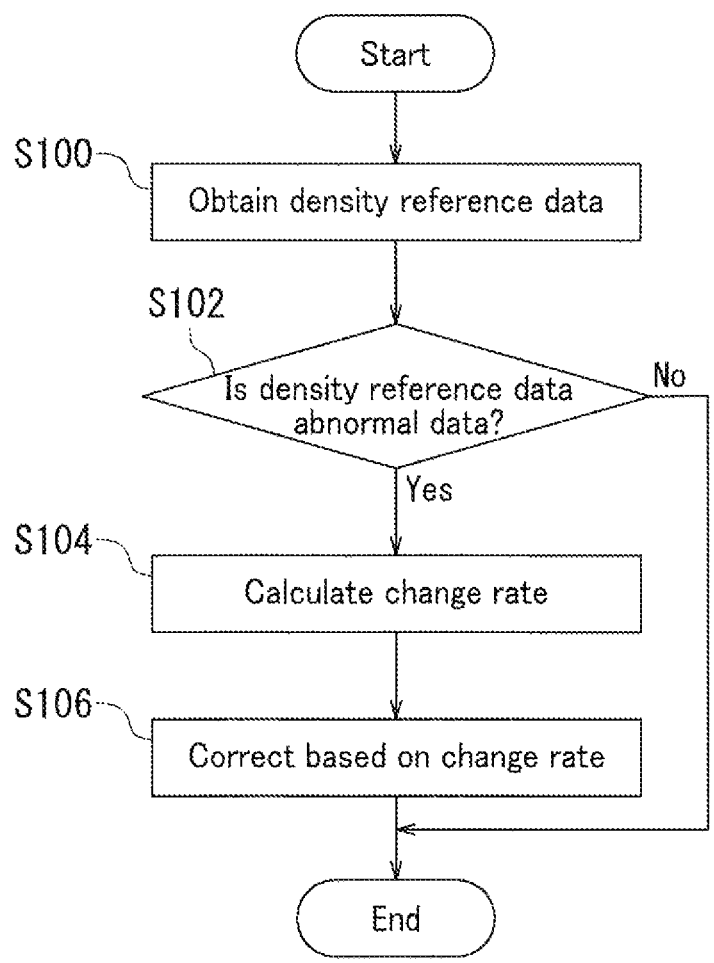
FIG. 2 is a flowchart of one example of an operation for setting density reference data performed in an image reading method according to the present embodiment.

With reference to FIGS. 1 and 2, the following now describes the image reading method according to the embodiment, performed by the image reading device 10 according to the present disclosure. FIG. 2 is a flowchart of one example of an operation of setting density reference data performed in the image reading method according to the present embodiment. In the image reading method according to the present embodiment, Steps S100 to S106 are performed as shown in FIG. 2 to set density reference data and then read an image of the original document M based on the density reference data thus set. As described above, the storage section 40 stores preliminary density reference data prior to that the image reading section 20 starts reading the density reference plate 50.

Step S100: Obtain density reference data. The image reading section 20 obtains, with respect to each of the plurality of regions, density reference data for each of the plurality of colors (red, green, and blue according to the present embodiment) by reading the density reference plate 50. The value of density reference data may be significantly reduced due to flaw or dust on the density reference plate 50. Yet, the present embodiment applies correction on the obtained density reference data. Note that even without flaw or the like on the density reference plate 50, the value of the density reference data may also be reduced as compared with the preliminary density reference data due to the aging degradation of the light source 21, the optical system 26, and/or the imaging section 27.

Step S102: The control section 30 determines, with respect to each of the plurality of regions, whether or not the density reference data obtained by the image reading section 20 is abnormal data. For example, the control section 30 specifies abnormal data by using a threshold value. More specifically, the control section 30 compares the density reference data with the threshold value. Suppose that a piece of density reference data exceeds the threshold value to fall outside a predetermined range, the control section 30 determines that piece of density reference data as abnormal data, in addition to the pieces of density reference data corresponding to the predetermined regions located immediately before and after the region corresponding to the determined abnormal data. Alternatively, the control section 30 may specify abnormal data by using the amount of change in the density reference data.

If none of the density reference data with respect to each of the plurality of regions is abnormal data (Step S102: No), the operation for setting density reference data that is for reading the original document M ends without correction of the density reference data. The density reference data thus set is used for reading the original document M. On the other hand, if any of the density reference data is abnormal data (Step S102: Yes), the image reading method moves to Step S104.

Step S104: When the density reference data for at least one of the plurality of colors with respect to at least one of the plurality of regions is abnormal data, the control section 30 calculates a change rate that is the rate of change between: the preliminary density reference data stored in the storage section 40 for one of the colors other than the at least one color with respect to the at least one region; and the density reference data for the one color other than the at least one color with respect to the at least one region. Suppose, for example, that the density reference data for green with respect to one specific region is abnormal data, and the density reference data for the other colors, namely red and blue, with respect to the specific region is not abnormal data. In this case, the change rate(s) is calculated between: the preliminary density reference data stored in the storage section 40 for red and/or blue with respect to the specific region; and the density reference data obtained for red and/or blue with respect to the specific region.

Step S106: The control section 30 corrects the abnormal data based on the thus calculated change rate and the preliminary density reference data for the color corresponding to the abnormal data. Suppose, for example, that the piece of density reference data for green is abnormal data, and the density reference data for neither red nor blue is abnormal data. In this case, the abnormal data for green is corrected based on the change rate calculated for red and/or blue and the preliminary density reference data for green. The density reference data thus corrected is used for reading image of the original document M.

Figure 3A:
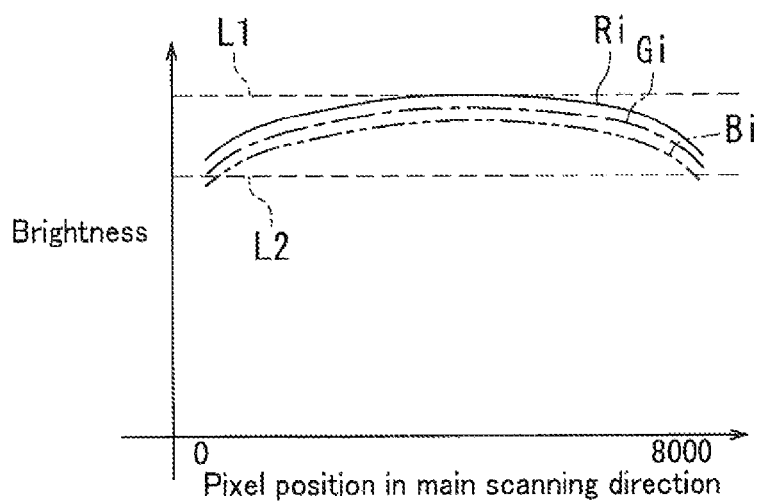
FIG. 3A is a schematic illustration of preliminary density reference data Ri, Gi, and Bi.
Figure 3B:
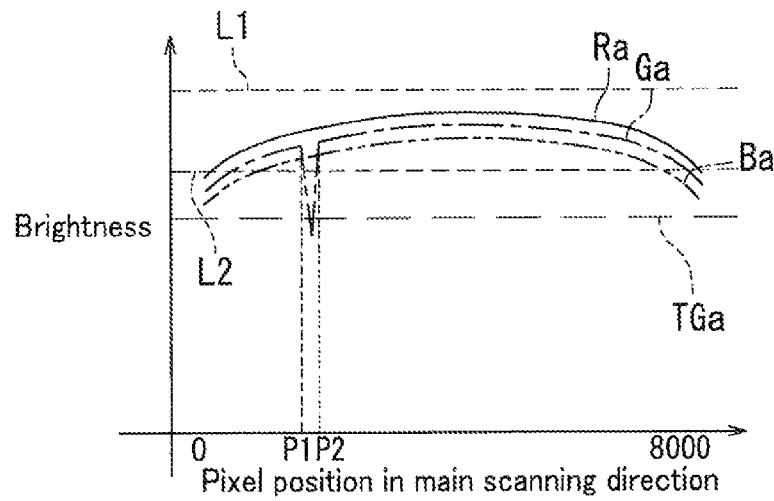
FIG. 3B is a schematic illustration of density reference data Ra, Ga, and Ba obtained in Step S100 shown in FIG. 2.
Figure 3C:
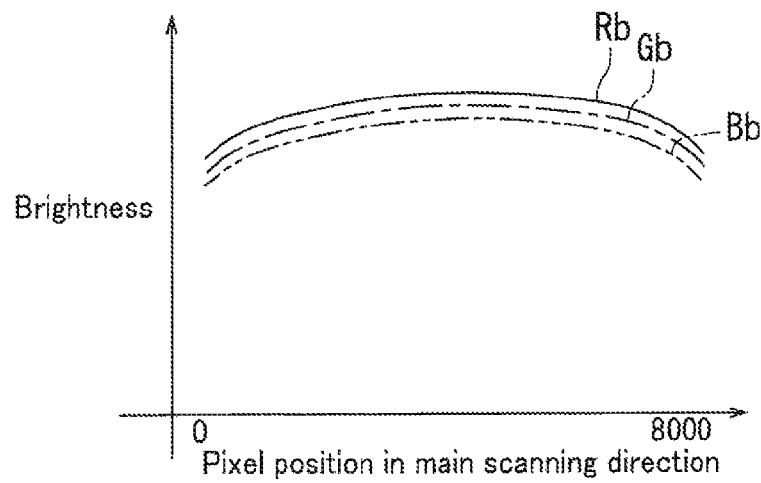
FIG. 3C is a schematic illustration of post-correction density reference data Rb, Gb, and Bb.

With reference to FIGS. 1-3, the following now describes one example of an operation for setting density reference data performed in the image reading method by the image reading device 10 according to the present embodiment. In each of FIGS. 3A, 3B, and 3C, the horizontal axis indicates the position of a pixel region in the main scanning direction, whereas the vertical axis indicates the brightness.

FIG. 3A is a schematic illustration of the preliminary density reference data Ri, Gi, and Bi. The preliminary density reference data Ri is a piece of preliminary density reference data for red. The preliminary density reference data Gi is a piece of preliminary density reference data for green. The preliminary density reference data Bi is a piece of preliminary density reference data for blue. The pieces of preliminary density reference data Ri, Gi, and Bi are stored in the storage section 40 to be used for reading the original document M, prior to that the image reading section 20 starts reading the density reference plate 50. Typically, the pieces of preliminary density reference data Ri, Gi, and Bi are the results obtained by reading the density reference plate 50 by the image reading section 20 prior to that the original document M is placed on the document table 11 of the image reading device 10 (for example, prior to the factory shipment). Here, in the decreasing order of brightness, the pieces of preliminary density reference data Ri, Gi, and Bi are listed in the stated order. In FIG. 3A, dotted lines L1 and L2 together indicate the range within which the values of the preliminary density reference data Ri, Gi, and Bi generally fall.

Step S100: By reading the density reference plate 50, the image reading section 20 obtains density reference data to be used for reading the original document M. Typically, the image reading section 20 obtains the density reference data prior to reading the original document M. The image reading section 20 reads the density reference plate 50 to obtain, with respect to each of the plurality of regions, the density reference data for each of red, green, and blue.

FIG. 3B is a schematic illustration of density reference data Ra, Ga, and Ba obtained in Step S100 shown in FIG. 2. The density reference data Ra is a piece of density reference data for red. The density reference data Ga is a piece of density reference data for green. The density reference data Ba is a piece of density reference data for blue. For the purpose of reference, FIG. 3B also indicates the dot lines L1 and L2 shown in FIG. 3A to indicate the range within which the values of the preliminary density reference data Ri, Gi, and Bi generally fall.

It is shown that the values of the density reference data Ra, Ga, and Ba are reduced as compared with the values of the preliminary density reference data Ri, Gi, and Bi shown in FIG. 3A. Typically, the reduction results from the aging degradation of the light source 21, the optical system 26, and/or the imaging section 27. Here, the values of the density reference data Ra, Ga, and Ba shown in FIG. 3B are respectively reduced by 5% as compared with the values of the preliminary density reference data Ri, Gi, and Bi shown in FIG. 3A. Due to the influence of flaw or the like on the density reference plate 50, the density reference data Ga changes abruptly from the position P1 to the position P2 as compared with other positions.

Step S102: The control section 30 determines, with respect to each of the plurality of regions, whether or not each of the pieces of density reference data Ra, Ga, and Ba obtained by the image reading section 20 is abnormal data. For example, the control section 30 compares, with respect to each of the plurality of regions, each of the pieces of density reference data Ra, Ga, and Ba with a threshold value to determine whether or not the piece of density reference data Ra, Ga, or Ba exceeds the threshold value to fall outside of the predetermined range. If any of the pieces of density reference data Ra, Ga, and Ba with respect to one of the plurality of regions exceeds the threshold value, the control section 30 determines as abnormal data the piece of density reference data Ra, Ga, or Ba exceeding the threshold value and the pieces of density reference data Ra, Ga, or Ba with respect to the predetermined regions that are located immediately before and after the region corresponding to the piece of reference data Ra, Ga, or Ba exceeding the threshold value. Alternatively, when a piece of density reference data Ra, Ga, or Ba is determined to exceed the threshold value, abnormal data may be specified based on the amount of change in the density reference data Ra, Ga, or Ba exceeding the threshold value. Typically, the pieces of density reference data Ra, Ga, or Ba with respect to the predetermined contiguous regions are determined as abnormal data.

If none of the pieces of density reference data Ra, Ga, and Ba with respect to each of the plurality of regions is abnormal data (Step S102: No), the operation for setting density reference data that is for reading the original document M ends without correction of the density reference data. The density reference data thus set is used for reading the original document M. On the other hand, if any of the pieces of density reference data Ra, Ga, and Ba is abnormal data (Step S102: Yes), the image reading method moves to Step S104.

FIG. 3B shows a threshold value TGa, which is the lower limit of the density reference data for green. The threshold value TGa is the lower limit of the density reference data for green. Although not shown in FIG. 3B to avoid complexly, threshold values TRa and TBa are also set for the density reference data for red and blue, respectively. The respective threshold values of red, green, and blue may be mutually different. In addition, although the lower limit values are exclusively used as the threshold values in this embodiment, the upper limit values may be additionally set as the threshold values.

For example, the control section 30 compares each of the pieces of density reference data Ra, Ga, and Ba with the corresponding one of the threshold values TRa, TGa, and TBa to determine whether or not the piece of density reference data is abnormal data. For example, the control section 30 determines, as abnormal data, each piece of density reference data equal to or less then the corresponding threshold value, in addition to the pieces of density reference data corresponding to the regions that are 50 pixels before and after the region corresponding to the piece of density reference data determined as abnormal data. In one example, suppose that a piece of density reference data is equal to or less than the threshold value with respect to the pixel region from positions 1000 to 1100, the control section 30 determines, as abnormal data, all pieces of density reference data corresponding to the pixel regions from positions 950 to 1150. In FIG. 3B, none of the density reference data Ra and Ba is abnormal data, whereas part of the density reference data Ga is abnormal data. Since part of the density reference data Ga is abnormal data (Step S102: Yes), the image reading method moves onto Step S104.

Alternatively, the control section 30 specifies abnormal data based on the amount of change in the density reference data Ga. With respect to the amount of change in the density reference data, the value of the density reference data Ga changes from the position P1 to the position P2 to a greater extent than the change in the other positions. The control section 30 specifies, as abnormal data, the density reference data corresponding to the region(s) from the position P1 to the position P2 where the amount of change is greater.

Step S104: The control section 30 calculates the change rate between the preliminary density reference data and the density reference data. As described above, the density reference data Ga with respect to each region from the position P1 to the position P2 is abnormal data. In addition, none of the density reference data Ga with respect to the other regions is abnormal data, and none of the density reference data Ra and Ba is abnormal data. In this case, the control section 30 calculates the change rate between the preliminary density reference data Ri and/or Bi stored in the storage section 40 with respect to each region from the position P1 to the position P2 and the density reference data Ra and/or Ba obtained with respect to the corresponding region from the position P1 to the position P2.

With reference to FIGS. 3A and 3B, the following specifically describes Step S104. The control section 30 calculates, with respect to each region from the position P1 to the position P2, the change rate Ra/Ri between the preliminary density reference data Ri and the density reference data Ra as well as the change rate Ba/Bi between the preliminary density reference data Bi and the density reference data Ba. In this example, the change rate Ra/Ri and the change rate Ba/Bi are both calculated to be 0.95.

In the case where the density reference data with respect to one region is abnormal data for one color but not abnormal data for two or more other colors, the control section 30 may calculate the average of the respective change rates each calculated between the preliminary density reference data and the density reference data for the two or more other colors. Suppose, for example, that the change rate Ra/Ri is 0.96 and the change rate Ba/Bi is 0.97. In this case, the control section 30 calculates the average of the change rates Ra/Ri and Ba/Bi, which is given as (0.96+0.97)/2=0.965.

Step S106: The control section 30 corrects the abnormal data based on the thus calculated change rate and the piece of preliminary density reference data for the color corresponding to the color of the density reference data determined as the abnormal data. For example, the control section 30 corrects, with respect to each region from the position P1 to the position P2, the abnormal data to the value obtained by multiplying the preliminary density reference data Gi by the change rate Ra/Ri. The change rate used as the multiplier may alternatively be the change rate Ba/Bi or the average of the change rates Ra/Ri and Ba/Bi. In this way, when the density reference data for one color (Ga)) is determined to be abnormal data, the abnormal data is relatively corrected, by multiplying the preliminary density reference data for the one color (Gi) by the change rate of the density reference data for the one or more of the other colors (Ra/Ri and/or Ba/Bi). As a result, the abnormal data is corrected.

FIG. 3C is a schematic illustration of post-correction density reference data Rb, Gb, and Bb. The post-correction density reference data Rb is a piece of corrected density reference data for red. The post-correction density reference data Gb is a piece of corrected density reference data for green. The post-correction density reference data Bb is a piece of corrected density reference data for blue. As described above, none of the pieces of density reference data Ra and Ba is abnormal data and thus no correction is made. Therefore, the pieces of post-correction density reference data Rb and Bb are respectively the same as the pieces of density reference data Ra and Ba, which are before correction. On the other hand, the density reference data Ga contains in part abnormal data and thus subjected to correction. Thus, the post-correction density reference data Gb is different from the density reference data Ga, which is before correction. More specifically, the post-correction density reference data Gb and the density reference data Ga, which is before correction, are different from each other with respect to the regions from the position P1 to the position P2 but are the same with respect to the other regions.

As has been described with reference to FIGS. 1-3, the control section 30 of the image reading device 10 determines whether or not the density reference data obtained by the image reading section 20 for each of the plurality of colors is abnormal data. In the case where the density reference data for at least one of the plurality of colors with respect to at least one region is abnormal data, the control section 30 calculates a change rate that is the rate of change between: the preliminary density reference data stored in the storage section 40 for one of the colors other than the at least one color with respect to the at least one region; and the density reference data for the one color other than the at least one color with respect to the at least one region. The control section 30 corrects the abnormal data based on the thus calculated change rate and the preliminary density reference data for the color corresponding to the abnormal data. That is to say, although the values of the density reference data on the whole are reduced due to the aging degradation of the light source 21, the optical system 26 and/or the imaging section 27, the image reading device 10 can correct the abnormal data correspondingly to the change of the density reference data. Therefore, the density reference data can be set to the values corrected to reduce the influence of the aging degradation.

Figure 4:
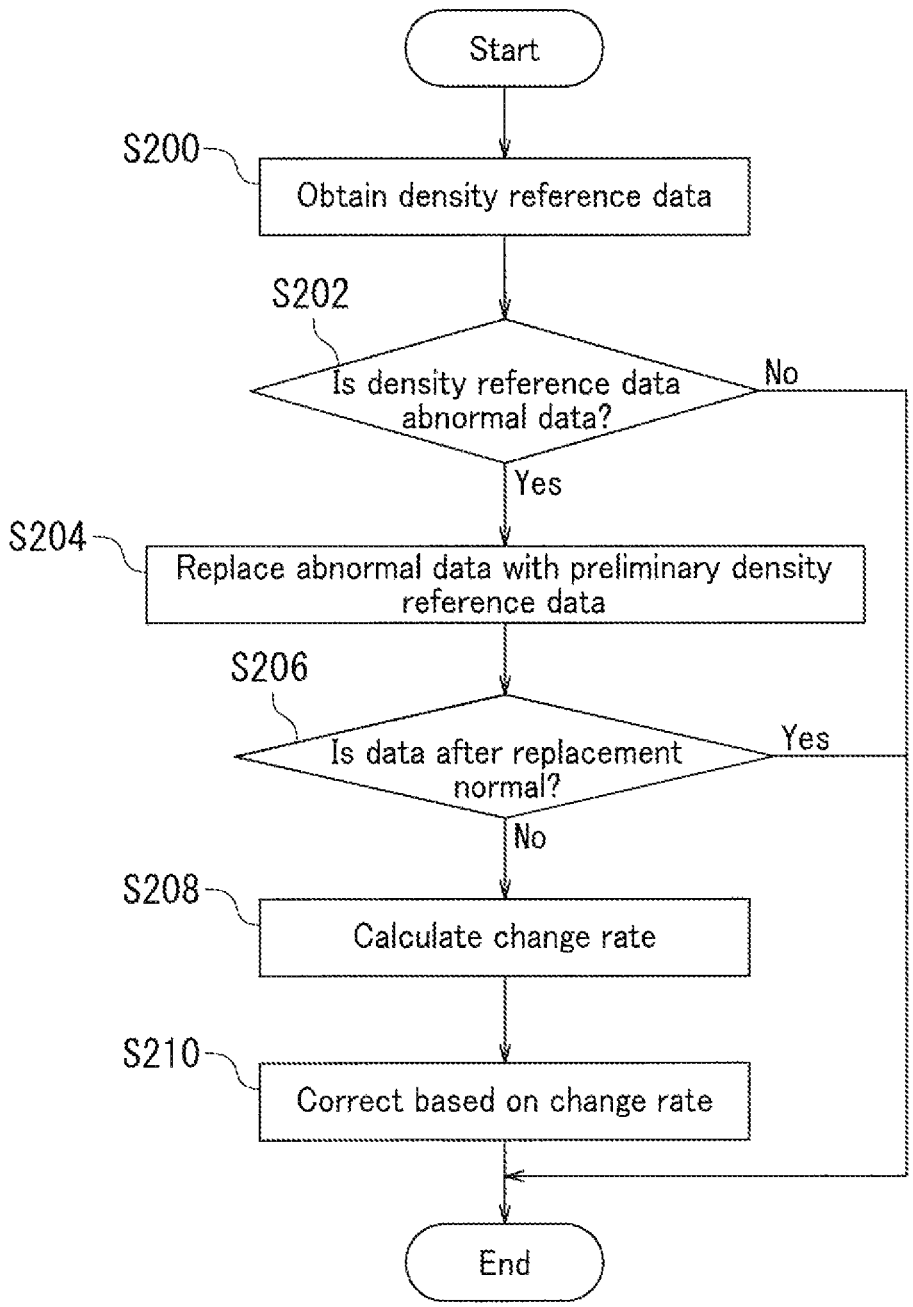
FIG. 4 is a flowchart of an image reading method performed by the image reading device, according to another embodiment of the present disclosure.

With reference to FIGS. 1 and 4, the following now describes an image reading method according to another embodiment, performed by the image reading device 10 according to the present disclosure. FIG. 4 is a flowchart of the image reading method performed by the image reading device 10 according to the embodiment of the present disclosure. In the image reading method according to the present embodiment, Steps S200 to S210 are performed as shown in FIG. 4 to set the density reference data and then read an image of the original document M based on the density reference data thus set. As described above, the storage section 40 stores in advance the preliminary density reference data prior to that the image reading section 20 starts reading the density reference plate 50. No detailed description is given of the contents overlapping with the description already given above with reference to the flowchart shown in FIG. 2.

Step S200: Obtain density reference data (corresponding to Step S100 shown in FIG. 2). The image reading section 20 obtains, with respect to each of the plurality of regions, density reference data for each of the plurality of colors (red, green, and blue according to the present embodiment), by reading the density reference plate 50.

Step S202: The control section 30 determines, with respect to each of the plurality of regions, whether or not each piece of density reference data obtained by the image reading section 20 is abnormal data (corresponding to Step S102 shown in FIG. 2).

If none of the pieces of density reference data obtained with respect to each of the plurality of regions is abnormal data (Step S202: No), the operation for setting density reference data for reading the original document M ends without correction of the density reference data. The density reference data thus set is used for reading the original document M. On the other hand, if any of the pieces of density reference data is abnormal data (Step S202: Yes), the image reading method moves to Step S204.

Step S204: The control section 30 replaces the abnormal data with a corresponding piece of preliminary density reference data.

Step S206: The control section 30 determines whether or not the density reference data resulting from the replacement is normal. For example, the control section 30 uses a threshold value to determine whether or not the density reference data resulting from the replacement is normal. The control section 30 compares the density reference data resulting from the replacement with the threshold value to determine whether or not the value of density reference data resulting from the replacement exceeds the threshold value to fall outside the predetermined range. If so, the density reference data resulting from the replacement is determined as not normal. Alternatively, the control section 30 determines the density reference data resulting from the replacement as not normal if the brightness order of the pieces of density reference data for the respective colors differs between the region corresponding to the density reference data resulting from the replacement and the region not corresponding to any abnormal data.

When the density reference data resulting from the replacement is normal (Step S206: Yes), the operation for setting density reference data for reading the original document M ends without correction of the density reference data based on the change rate. On the other hand, when the replaced data is not normal (Step S206: No), the image reading method moves onto Step S208.

Step S208: The control section 30 calculates a change rate that is the rate of change between: the preliminary density reference data stored in the storage section 40 for one of the colors other than the color corresponding to the abnormal data with respect to the region corresponding to the abnormal data; and the density reference data for the one color other than the color corresponding to the abnormal data with respect to the region corresponding to the abnormal data (corresponding to Step S104 shown in FIG. 2).

Step 210: The control section 30 corrects the abnormal data based on the thus calculated change rate and the piece of preliminary density reference data for the color corresponding to the abnormal data (corresponding to S106 shown in FIG. 2). The density reference data thus corrected is used for reading image of the original document M.

Figure 5A:
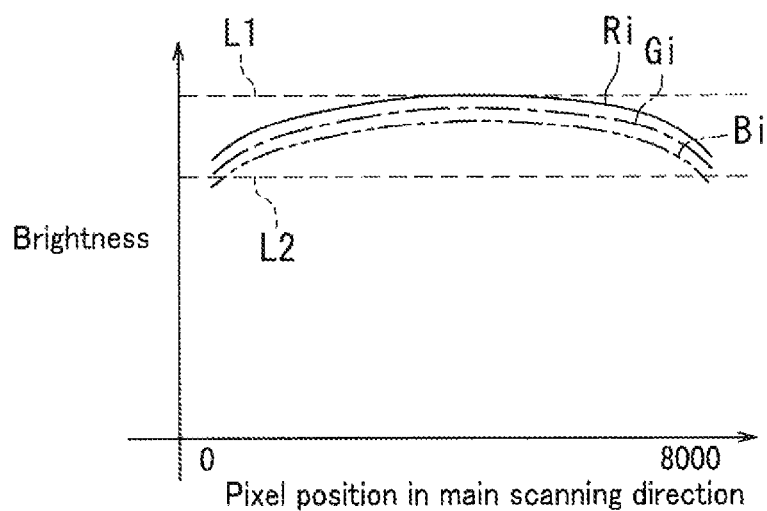
FIG. 5A is a schematic illustration of preliminary density reference data Ri; Gi; Bi.
Figure 5B:
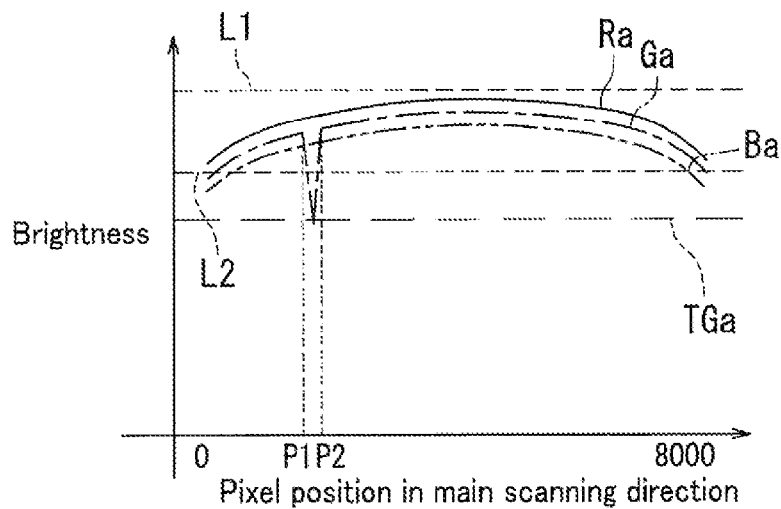
FIG. 5B is an schematic illustration of density reference data Ra, Ga, and Ba obtained in Step S200 shown in FIG. 4.
Figure 5C:
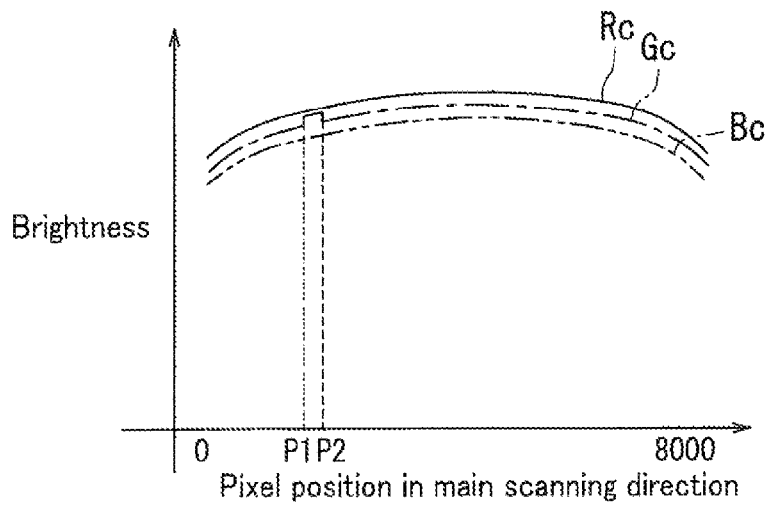
FIG. 5C is a schematic illustration of post-correction density reference data Rc, Gc, and Bc.

With reference to FIGS. 1, 4, and 5, the following now describes one example of the operation for settings the density reference data in the image reading method performed by the image reading device 10 according to the present embodiment. The horizontal axis in each of FIGS. 5A, 5B, and 5C indicates the position of a pixel region in the main scanning direction. The vertical axis of each of FIGS. 5A, 5B, and 5C indicates the brightness. No detailed description is given of the contents overlapping with the description already given above with reference to FIGS. 2 and 3.

FIG. 5A is a schematic illustration of the preliminary density reference data Ri, Gi, and Bi. The preliminary density reference data Ri is a piece of preliminary density reference data for red. The preliminary density reference data Gi is a piece of preliminary density reference data for green. The preliminary density reference data Bi is a piece of preliminary density reference data for blue.

Step S200: By reading the density reference plate 50, the image reading section 20 obtains the density reference data to be used for reading the original document M (corresponding to Step S100 shown in FIG. 2).

FIG. 5B is a schematic illustration of density reference data Ra, Ga, and Ba obtained in Step S200 shown in FIG. 4. The density reference data Ra is a piece of density reference data for red. The density reference data Ga is a piece of density reference data for green. The density reference data Ba is a piece of density reference data for blue. For the purpose of reference, FIG. 5B also indicates the dot lines L1 and L2 shown in FIG. 5A to indicate the range within which the values of the preliminary density reference data Ri, Gi, and Bi generally fall.

It is shown that the values of the density reference data Ra, Ga, and Ba are slightly reduced as compared with the values of the preliminary density reference data Ri, Gi, and Bi shown in FIG. 5A. Typically, the reduction results from the aging degradation of the light source 21, the optical system 26, and/or the imaging section 27. Due to the influence of flaw or the like on the density reference plate 50, the value of the density reference data Ga changes abruptly from the position P1 to the position P2 as compared with other positions.

Step S202: The control section 30 determines, with respect to each of the plurality of regions, whether or not the pieces of density reference data Ra, Ga, and Ba obtained by the image reading section 20 is abnormal data (corresponding to Step S102 shown in FIG. 2).

If none of the pieces of density reference data Ra, Ga, and Ba with respect to each of the plurality of regions is abnormal data (Step S202: No), the operation for setting density reference data for reading the original document M ends without correction of the density reference data. The density reference data thus set is used for reading the original document M. On the other hand, if any of the pieces of density reference data Ra, Ga, and Ba is abnormal data (Step S202: Yes), the image reading method moves to Step S204.

The control section 30 compares each of the pieces of density reference data Ra, Ga, and Ba with the corresponding one of the threshold values TRa, TGa, and TBa to determine whether or not the piece of density reference data is abnormal data. In FIG. 5B, none of the density reference data Ra and Ba is abnormal data, whereas part of the density reference data Ga is abnormal data. Since part of the density reference data Ga is abnormal data (Step S202: Yes), the image reading method moves onto Step S204.

Step S204: The control section 30 replaces the abnormal data with a corresponding piece of preliminary density reference data. Here, the control section 30 replaces the density reference data Ga with the preliminary density reference data Gi with respect to each region from the position P1 to the position P2. The density reference data Gc shown in FIG. 5C is the data resulting from the replacement.

FIG. 5C is a schematic illustration of post-correction density reference data Rc, Gc, and Bc. The post-correction density reference data Rc is a piece of corrected density reference data for red. The post-correction density reference data Gc is a piece of corrected density reference data for green. The post-correction density reference data Bc is a piece of corrected density reference data for blue.

Step S206: The control section 30 determines whether or not the post-correction density reference data, which is the density reference data resulting from the replacement, is normal. Here, the control section 30 determines, with respect to each region from the position P1 to the position P2, whether or not the pieces of post-correction density reference data satisfies the relation Rc>Gc>Bc. In the example shown in FIG. 5C, the relation Rc>Gc>Bc is satisfied. The control section 30 therefore determines that the density reference data resulting from the replacement is normal (Step S206: Yes). As describe above, when a piece of density reference data for one of the plurality of colors (Ga) is determined as abnormal, the abnormal data is corrected by replacing it with the piece of preliminary density reference data for the corresponding color (the preliminary density reference data Gi).

As described above, none of the pieces of density reference data Ra and Ba is abnormal data. Therefore, no correction is made. Thus, the pieces of post-correction density reference data Rc and Bc are the same as the pieces of density reference data Ra and Ba before correction. On the other hand, the pieces of density reference data Ga contain in part abnormal data and thus subjected to correction. Thus, the post-correction density reference data Gc is different from the density reference data Ga before correction. More specifically, the post-correction density reference data Gc and the density reference data Ga, which is before correction, are different from each other with respect to regions from the position P1 to the position P2 but are the same with respect to the other regions.

As described above with reference to FIGS. 1, 4, and 5, when the density reference data for at least one of the colors is determined as abnormal data, the control section 30 of the image reading device 10 corrects the abnormal data by replacing it with the preliminary density reference data of the corresponding color. Since the control section 30 makes the replacement before correction based on the change rate, the replacement alone may be sufficient for the correction in the case where the reduction in the density reference data from the preliminary density reference data due to the aging degradation is relatively small. Therefore, the processing time taken for the density reference data correction can be shortened.

Figure 6:
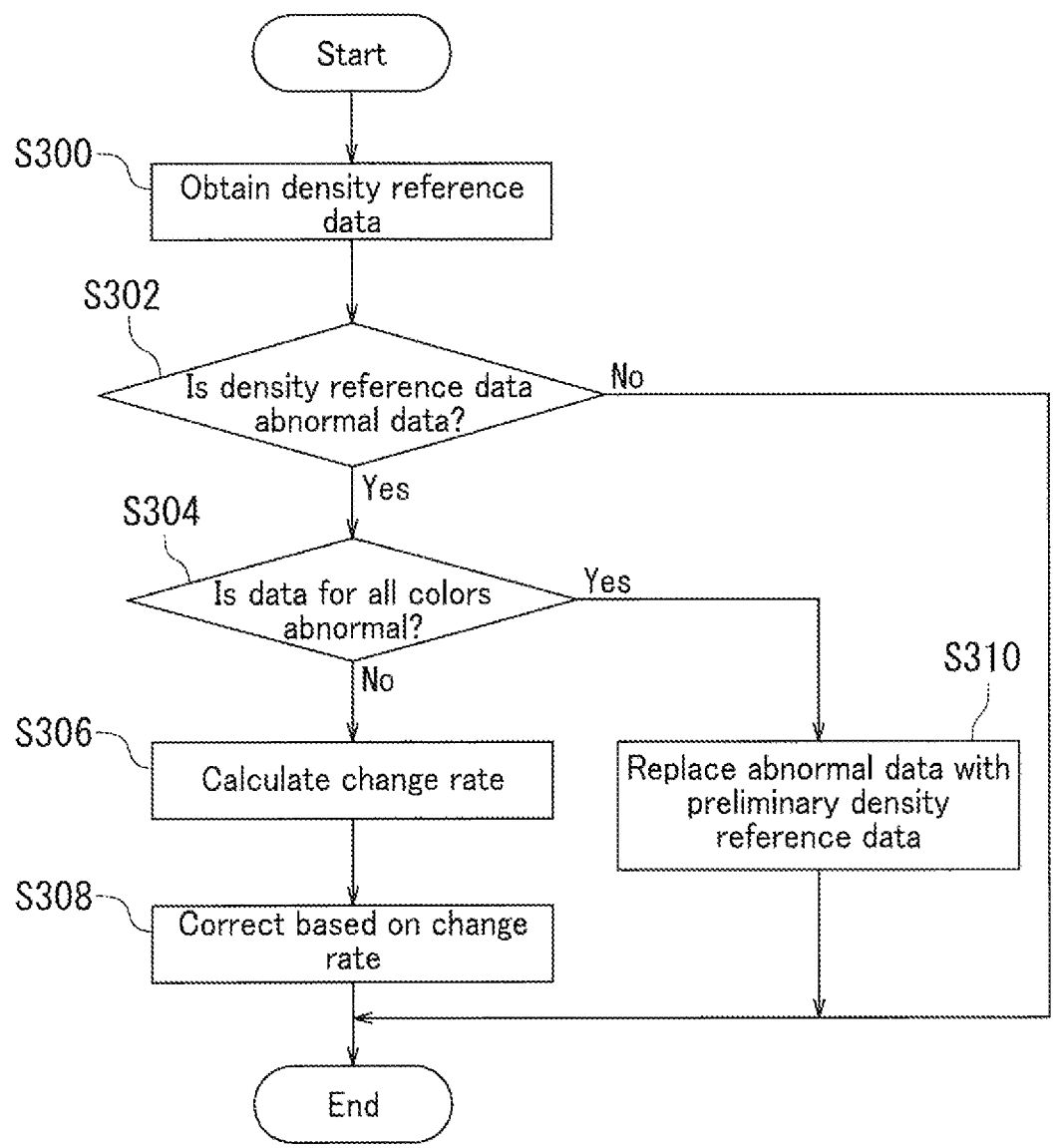
FIG. 6 is a flowchart of an image reading method performed by the image reading device, according to another embodiment of the present disclosure.

With reference to FIGS. 1 and 6, the following now describes an image reading method according to another embodiment, performed by the image reading device 10 according to the present disclosure. FIG. 6 is a flowchart of the image reading method performed by the image reading device 10 according to the embodiment of the present disclosure. In the image reading method according to the present embodiment, Steps S300 to S310 are performed as shown in FIG. 6 to obtain the post-correction density reference data and then to read an image of the original document M based on the post-correction density reference data thus obtained. As described above, the storage section 40 stores in advance the preliminary density reference data prior to that the image reading section 20 starts reading the density reference plate 50. No detailed description is given of the contents overlapping with the description already given above with reference to the flowcharts shown in FIGS. 2 and 4.

Step S300: Obtain density reference data (corresponding to Step S100 shown in FIG. 2). By reading the density reference plate 50, the image reading section 20 obtains, with respect to each of a plurality of regions, density reference data for each of the plurality of colors (red, green, and blue according to the present embodiment).

Step S302: The control section 30 determines, with respect to each of the plurality of regions, whether or not each piece of density reference data obtained by the image reading section 20 is abnormal data (corresponding to Step S102 shown in FIG. 2).

Step S304: The control section 30 determines, with respect to a region corresponding to abnormal data, whether or not all the pieces of density reference data for the respective colors are abnormal data. If the pieces of density reference data for the respective colors with respect to at least one region are all abnormal data (Step S304: Yes), the image reading method moves onto Step S310. If not all the pieces of density reference data for the respective colors with respect to the at least one region is abnormal data (Step S304: No), the image reading method moves onto Step S306.

Step S306: When not all the pieces of density reference data for the respective colors is abnormal data (Step S304: No), the control section 30 calculates a change rate that is the rate of change between: the preliminary density reference data stored in the storage section 40 for one of the colors other than the color corresponding to the abnormal data with respect to the region corresponding to the abnormal data; and the density reference data for the one color other than the color corresponding to the abnormal data with respect to the region corresponding to the abnormal data (corresponding to Step S104 shown in FIG. 2).

Step 308: The control section 30 corrects the abnormal data based on the thus calculated change rate and the piece of preliminary density reference data for the color corresponding to the abnormal data (corresponding to S106 shown in FIG. 2).

Step S310: When all the pieces of density reference data for the respective colors with respect to the region in which abnormal data is found are determined as abnormal data in Step S304 (Step S304: Yes), the control section 30 replaces the piece of abnormal data for the respective colors each with a piece of preliminary density reference data for the corresponding color (corresponding to Step S204 shown in FIG. 4).

In the manner described above, the post-correction density reference data is set. The density reference data thus set is used for reading image of the original document M as described above.

Figure 7A:
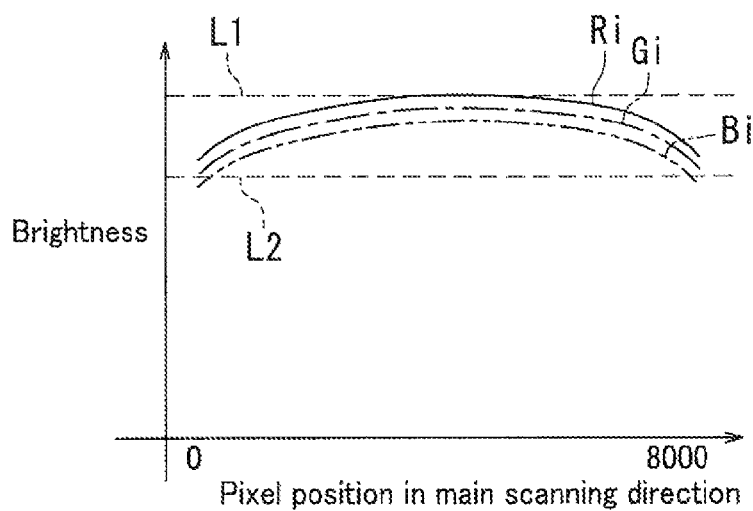
FIG. 7A is a schematic illustration of preliminary density reference data Ri, Gi, and Bi.
Figure 7B:
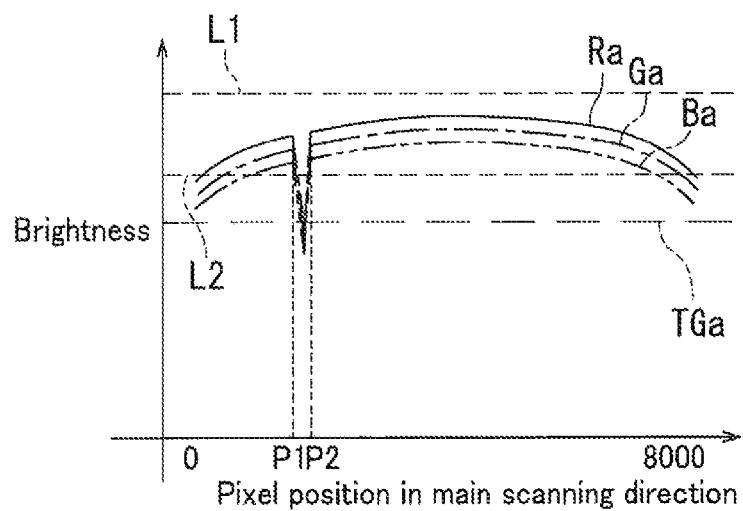
FIG. 7B is a schematic illustration of density reference data Ra, Ga, and Ba obtained in Step S300 shown in FIG. 6.
Figure 7C:
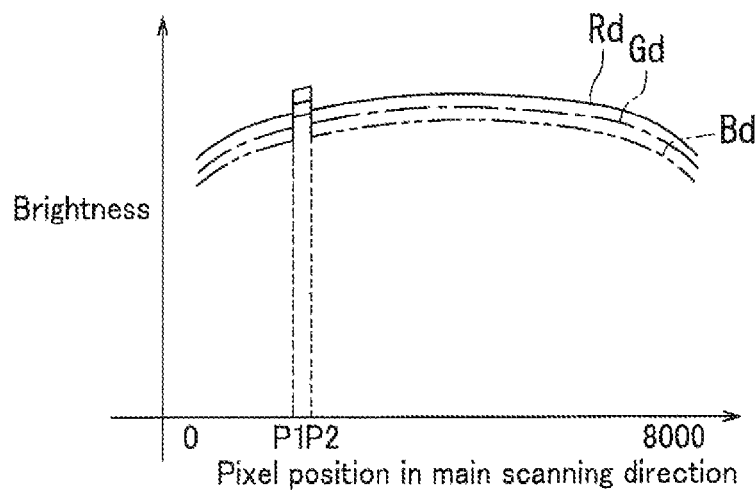
FIG. 7C is a schematic illustration of post-correction density reference data Rd, Gd, and Bd.

With reference to FIGS. 1, 6, and 7, the following now describes one example of another operation for setting density reference data performed in the image reading method by the image reading device 10 according to the present embodiment. The horizontal axis in each of FIGS. 7A, 7B, and 7C indicates the position of a pixel region in the main scanning direction. The vertical axis in each of FIGS. 7A, 7B, and 7C indicates the brightness. No detailed description is given of the contents overlapping with the description already given above with reference to FIGS. 2 to 5.

FIG. 7A is a schematic illustration of the preliminary density reference data Ri, Gi, and Bi. The preliminary density reference data Ri is preliminary density reference data for red. The preliminary density reference data Gi is preliminary density reference data for green. The preliminary density reference data Bi is preliminary density reference data for blue.

Step S300: By reading the density reference plate 50, the image reading section 20 obtains the density reference data to be used for reading the original document M (corresponding to Step S100 shown in FIG. 2).

FIG. 7B is a schematic illustration of density reference data Ra, Ga, and Ba obtained in Step S300 shown in FIG. 6. The density reference data Ra is density reference data for red. The density reference data Ga is density reference data for green. The density reference data Ba is density reference data for blue. For the purpose of reference, FIG. 7B also indicates the dot lines L1 and L2 shown in FIG. 7A to indicate the range within which the values of the preliminary density reference data Ri, Gi, and Bi generally fall.

As is shown with reference to the dot lines L1 and L2, the values of the density reference data Ra, Ga, and Ba are reduced as compared with the values of the preliminary density reference data Ri, Gi, and Bi shown in FIG. 7A. Typically, the reduction results from the aging degradation of the light source 21, the optical system 26, and/or the imaging section 27. Here, similarly to the case shown in FIGS. 3A and 3B, the values of the density reference data Ra, Ga, and Ba shown in FIG. 7B are reduced by 5% respectively as compared with the values of the preliminary density reference data Ri, Gi, and Bi shown in FIG. 7A. Due to the influence of flaw or the like on the density reference plate 50, the values of the respective pieces of density reference data Ra, Ga, and Ba all change abruptly from the position P1 to the position P2 as compared with other positions.

Step S302: The control section 30 determines, with respect to each of the plurality of regions, whether or not each of the pieces of density reference data Ra, Ga, and Ba obtained by the image reading section 20 is abnormal data (corresponding to Step S102 shown in FIG. 2).

If none of the respective pieces of density reference data Ra, Ga, and Ba with respect to each of the plurality of regions is abnormal data (Step S302: No), the operation for setting density reference data for reading the original document M ends without correction of the density reference data. The density reference data thus set is used for reading the original document M. On the other hand, if any of the respective pieces of density reference data Ra, Ga, and Ba is abnormal data (Step S302: Yes), the image reading method moves to Step S304.

For example, the control section 30 compares each of the pieces of density reference data Ra, Ga, and Ba with the corresponding one of the threshold values TRa, TGa, and TBa to determine whether or not the piece of density reference data is abnormal data. In FIG. 7B, the respective pieces of density reference data Ra, Ga, and Ba contain in part abnormal data. Since all the pieces of density reference data Ra, Ga, and Ba contain abnormal data (Step S302: Yes), the image reading method moves onto Step S304.

Step S304: The control section 30 determines, with respect to the region in which abnormal data is found, whether or not all the pieces of density reference data for the respective colors are abnormal data. Here, the pieces of density reference data for the respective colors of red, green, and blue are all abnormal data with respect to the region(s) from the position P1 to the position P2. Consequently, the control section 30 determines, with respect to at least one region, that the pieces of density reference data for the respective colors are all abnormal data (Step S304: Yes). Here, the image reading method moves to Step S310.

FIG. 7C is a schematic illustration of post-correction density reference data Rd, Gd, and Bd. The post-correction density reference data Rd is corrected density reference data for red. The post-correction density reference data Gd is corrected density reference data for green. The post-correction density reference data Bd is corrected density reference data for blue.

Step S310: The control section 30 replaces each piece of abnormal data with a corresponding piece of preliminary density reference data. Here, the control section 30 replaces the respective pieces of density reference data Ra, Ga, and Ba each with the corresponding piece of preliminary density reference data Ri, Gi, or Bi with respect to each region from the position P1 to the position P2. The data resulting from the replacement is the pieces of density reference data Rd, Gd, and Bd shown in FIG. 7C.

As described above, the pieces of density reference data Ra, Ga, and Ba are partly abnormal data. Therefore, the pieces of post-correction density reference data Rd, Gd, and Bd differ from the respective pieces of density reference data Ra, Ga, and Ba before correction. More specifically, the pieces of post-correction density reference data Rd, Gd, and Bd differ from the respective pieces of density reference data Ra, Ga, and Ba before correction, with respect to each region from the position P1 to the position P2. However, the order by brightness of the pieces of density reference data Rd, Gd, and Bd with respect to each region form the position P1 to the position P2 is the same as that with respect to the region not corresponding to any abnormal data.

As has been described above with respect to FIGS. 1, 6, and 7, in the case where the pieces of density reference data for the respective colors with respect to at least one region are all abnormal data, the control section 30 of the image reading device 10 replaces each piece of abnormal data with a corresponding piece of preliminary density reference data. That is, when the pieces of density reference data for the respective colors are all abnormal data with respect to one region, the correction is made such that the respective density reference data is corrected so as to have the same order by brightness as the pieces of density reference data with respect to another region where no abnormal data is found. Such correction ensures to reduce the risk of altering the color balance.

When a piece of density reference data is abnormal data, the control section 30 may store data indicating the presence of abnormal data in the storage section 40. By storing data indicating the presence of abnormal data in the storage section 40, a service person at the time of maintenance can be informed of the presence of abnormal data, which is helpful for the service person to repair flaw of the density reference plate.

Figure 8:
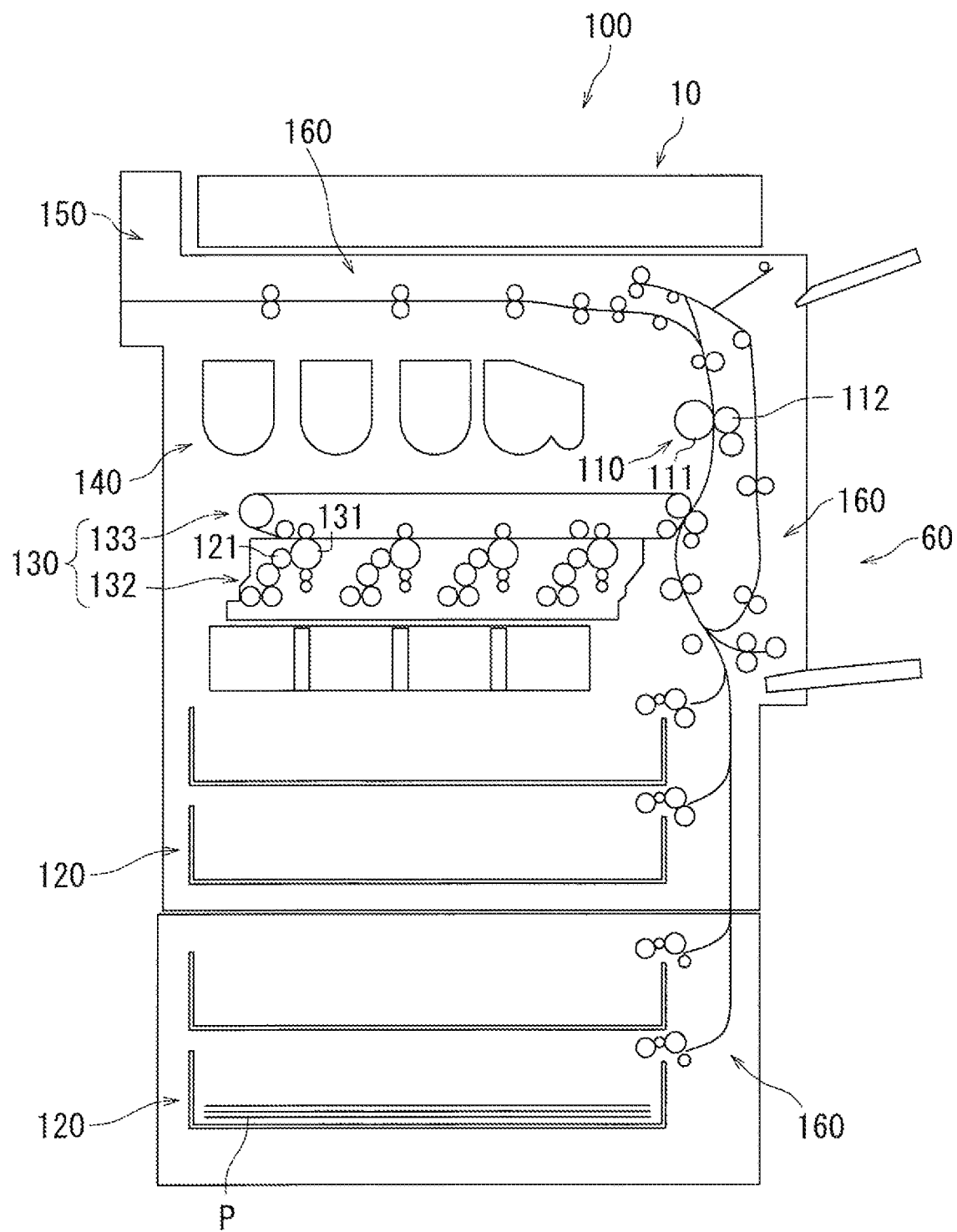
FIG. 8 is a schematic view of an image forming apparatus according to an embodiment of the present disclosure.

FIG. 8 is a schematic view of the image forming apparatus 100 according to the embodiment of the present disclosure. In the following description, the image forming apparatus 100 according to the present embodiment is a copier. The image forming apparatus 100 includes the image reading section 10 and a print section 60. The print section 60 includes a fixing device 110, a paper feed cassette 120, an image forming section 130, a toner replenishment device 140, a paper discharge section 150, and a paper conveyance section 160. The print section 60 prints an image based on the data read from the original document by the image reading device 10.

The paper feed cassette 120 is loaded with paper P for printing. For producing a copy, the paper P loaded in the paper feed cassette 120 is conveyed by the paper conveyance section 160 sequentially to the image forming section 130 and the fixing device 110 to be discharged from the paper discharge section 150.

The image forming section 130 forms a toner image on the paper P. The image forming section 130 includes a plurality of photosensitive members 131, a plurality of developing devices 132, and a transfer device 133.

On each photosensitive member 131, an electrostatic latent image is formed by a laser beam scanned based on the electronic signal representing the original document image formed by the image reading device 10. Each developing device 132 includes a development roller 121. Each development roller 121 carries toner to the corresponding photosensitive member 131 to cause an electrostatic latent image to be developed, whereby toner images are formed on the respective photosensitive members 131. The respective developing devices 132 are replenished with toner by the toner replenishment device 140.

The transfer device 133 transfer the toner images formed on the respective photosensitive members 131 to the paper P.

The fixing device 110 applies heat and pressure to the paper P by the fixing member 111 and the pressure member 112, so that the unfixed toner images formed by the image forming section 130 are fused to be fixed on the paper P.

The image reading device 10 is so structured that the imaging section 27 is a CCD sensor. However, the image reading device 10 may be of a contact image sensor (CIS) employing a CMOS image sensor as the imaging section 27.

In addition, although the density reference plate 50 of the image reading device 10 is a white reference plate, the reference plate may be of a different color. For example, the density reference plate 50 may be a black reference plate.

In addition, the original document M read by the image reading device 10 is not limited to paper. For example, the original document M may be cloth or a three-dimensional object with a thickness.

In addition, the image forming apparatus 100 is not limited to a copier and may alternatively be a copier, printer, a facsimile machine, or a multifunction peripheral having all of such functions.

What is claimed is:

1. An image reading device comprising:
a density reference plate;
an image reading section configured to obtain, with respect to each of a plurality of regions, density reference data for each of a plurality of colors by reading the density reference plate;
a storage section configured to store, with respect to each of the plurality of regions, preliminary density reference data for each of the plurality of colors; and
a control section configured to
determine, with respect to each of the plurality of regions, whether or not the density reference data obtained for each of the plurality of colors by the image reading section is abnormal data,
calculate a change rate when the density reference data for at least one of the plurality of colors with respect to at least one of the plurality of regions is the abnormal data, the change rate being a rate of change between the preliminary density reference data and the density reference data both for one of the colors other than the at least one color with respect to the at least one region, and
correct the abnormal data based on the change rate calculated with respect to the at least one region and also on the preliminary density reference data stored for the at least one color with respect to the at least one region,
wherein when the density reference data for the at least one color is the abnormal data, the control section replaces the abnormal data with the preliminary density reference data for the at least one color.

2. An image reading device according to claim 1, wherein the control section determines whether or not the density reference data for the at least one color is the abnormal data by comparing the density reference data and a threshold value.

3. An image reading device according to claim 1, wherein when the density reference data for each of the plurality of colors with respect to the at least one region is all abnormal data, the control section replaces each piece of abnormal data with the preliminary density reference data for a corresponding one of the plurality of colors with respect to the at least one region.

4. An image reading device according to claim 1, wherein the control section determines whether or not the density reference data resulting from the replacement is normal.

5. An image reading device according to claim 1, wherein the control section stores, into the storage section, new density reference data that is newly obtained by reading the density reference plate.

6. An image reading device according to claim 1, wherein the control section specifies the abnormal data based on an amount of change in the density reference data for the at least one color.

7. An image reading device according to claim 1, wherein the control section calculates the change rate by calculating an average of change rates for the density reference data for two or more of the colors other than the at least one color with respect to the at least one region.

8. An image reading device according to claim 1, wherein the control section stores, into the storage section, data indicating presence of the abnormal data when the density reference data is abnormal data.

9. An image reading device according to claim 1, wherein the density reference plate is a white reference plate.

10. An image reading device according to claim 1, wherein the density reference plate is a black reference plate.

11. An image forming apparatus comprising:
an image reading device according to claim 1; and
a print section.

12. An image reading method comprising:
obtaining, with respect to each of a plurality of regions, density reference data for each of a plurality of colors by reading a density reference plate;
determining, with respect to each of the plurality of regions, whether or not the density reference data obtained for each of the plurality of colors is abnormal data;
calculating a change rate when the density reference data for at least one of the plurality of colors with respect to at least one of the plurality of regions is the abnormal data, the change rate being a rate of change between the preliminary density reference data and the density reference data both for one of the colors other than the at least one color with respect to the at least one region; and
correcting the abnormal data based on the change rate calculated with respect to the at least one region and also on the preliminary density reference data for the at least one color with respect to the at least one region,
wherein when the density reference data for the at least one color is the abnormal data, replacing the abnormal data with the preliminary density reference data for the at least one color.

* * * * *